United States Patent [19]
Gorodisher et al.

[11] Patent Number: 5,494,981
[45] Date of Patent: Feb. 27, 1996

[54] EPOXY-CYANATE ESTER COMPOSITIONS THAT FORM INTERPENETRATING NETWORKS VIA A BRONSTED ACID

[75] Inventors: Ilya Gorodisher, Stillwater; Michael C. Palazzotto, Woodbury, both of Minn.

[73] Assignee: Minnesota Mining and Manufacturing Company, St. Paul, Minn.

[21] Appl. No.: 398,230

[22] Filed: Mar. 3, 1995

[51] Int. Cl.$^6$ .............. C08G 8/20; C08L 61/00
[52] U.S. Cl. ............. 525/504; 525/505; 525/506; 525/529; 525/532; 525/535; 525/540; 525/903
[58] Field of Search ............. 525/504, 505, 525/506, 529, 532, 535, 540, 903

[56] References Cited

U.S. PATENT DOCUMENTS

| | | | |
|---|---|---|---|
| 3,553,244 | 1/1971 | Grigat | 260/453 |
| 3,879,312 | 4/1975 | Udding et al. | 528/409 |
| 3,907,706 | 9/1975 | Robins | 528/92 |
| 4,049,861 | 9/1977 | Nozari | 528/18 |
| 4,503,211 | 3/1985 | Robins | 528/92 |
| 4,558,078 | 12/1985 | Draney et al. | 525/523 |
| 4,604,452 | 8/1986 | Shimp | 528/422 |
| 4,785,075 | 11/1988 | Shimp | 528/422 |
| 4,797,454 | 1/1989 | Ryang | 525/476 |
| 4,902,752 | 2/1990 | Shimp | 525/390 |
| 4,956,393 | 9/1990 | Boyd et al. | 521/54 |
| 4,983,683 | 1/1991 | Shimp | 525/390 |
| 5,043,411 | 8/1991 | Ho et al. | 528/99 |
| 5,068,309 | 11/1991 | Shimp et al. | 528/211 |
| 5,086,088 | 2/1992 | Kitano | 522/170 |
| 5,089,440 | 2/1992 | Christie et al. | 437/209 |
| 5,149,863 | 9/1992 | Shimp et al. | 560/301 |
| 5,194,930 | 3/1993 | Papathomas et al. | 257/773 |
| 5,215,860 | 6/1993 | McCormick et al. | 430/270 |
| 5,250,848 | 10/1993 | Christie et al. | 525/122 |
| 5,262,232 | 11/1993 | Wilfong | 428/327 |
| 5,330,684 | 7/1994 | Emori et al. | 252/512 |
| 5,331,018 | 7/1994 | McGinniss | 522/16 |
| 5,350,635 | 9/1994 | Pokorny | 428/414 |
| 5,405,686 | 4/1995 | Portelli et al. | 428/229 |

Primary Examiner—Melvyn I. Marquis
Assistant Examiner—Randy Gulakowski
Attorney, Agent, or Firm—Gary L. Griswold; Walter N. Kirn; Lorraine R. Sherman

[57] ABSTRACT

A polymerizable composition of matter comprises a cycloaliphatic epoxy resin, a cyanate ester resin, optionally a polyol, and, as initiator, a Bronsted acid. When cured, the compositions provide interpenetrating polymer networks (IPNs). The IPNs are useful as high temperature stable vibration damping materials, adhesives, binders for abrasives, and protective coatings.

32 Claims, 3 Drawing Sheets

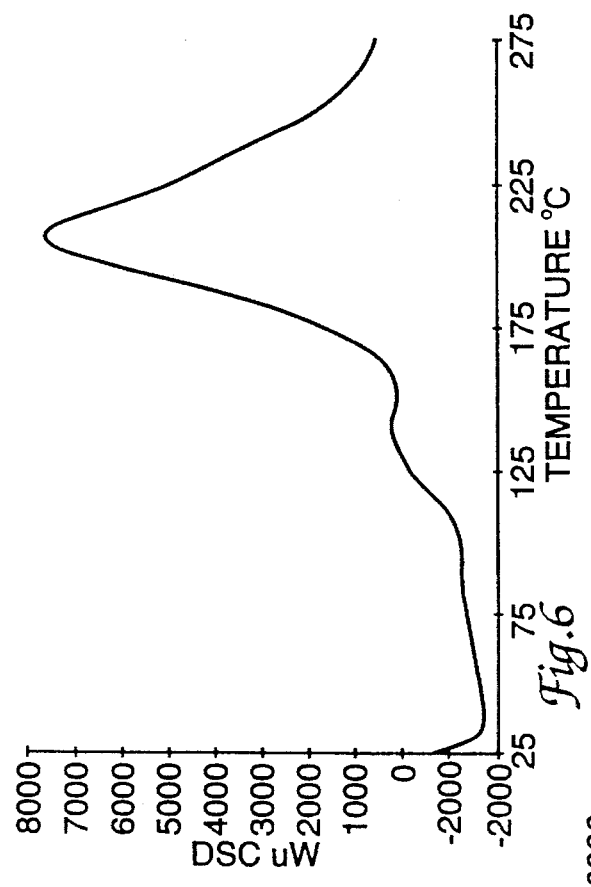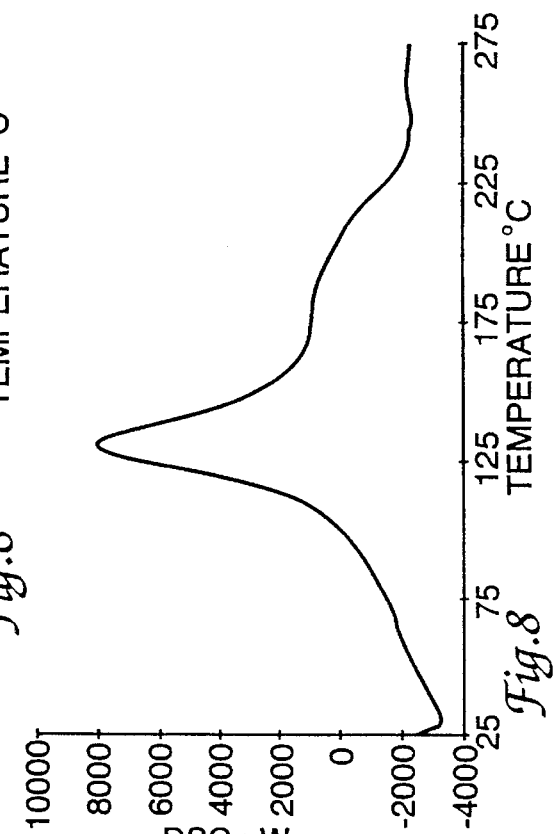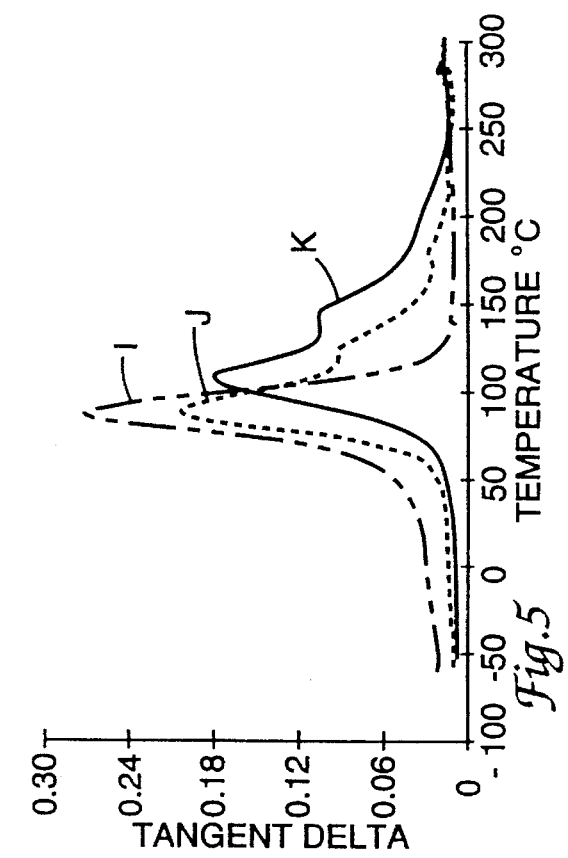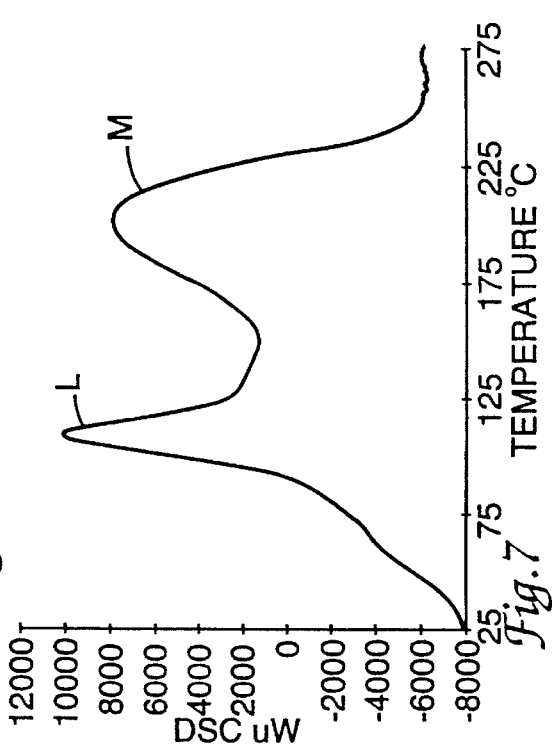

EPOXY-CYANATE ESTER COMPOSITIONS THAT FORM INTERPENETRATING NETWORKS VIA A BRONSTED ACID

FIELD OF THE INVENTION

This invention relates to mixed epoxy resin and cyanate ester resin compositions that can be cured to interpenetrating polymer networks (IPNs). The IPNs provide high temperature stable vibration damping materials, adhesives, binders for abrasives, and protective coatings.

BACKGROUND OF THE INVENTION

Industry is constantly searching for high temperature stable materials that resist degradation. Such materials can have utility, for example, as adhesives, and in vibration damping applications.

IPNs have been disclosed. Energy-curable compositions comprising interpenetrating polymer networks of epoxy resins and acrylate resins have been described (see, for example, U.S. Pat. Nos. 5,262,232 and 5,086,088) in which the compositions are stated to be useful as pressure sensitive adhesives and as vibration damping materials. However, the compositions have limited utility at higher temperatures.

Cyanate esters, which can be prepared by reacting polyhydric phenols with cyanogen bromide, as described in U.S. Pat. No. 3,553,244, are thermosetting resins having high heat resistance and, at the same time, considerable brittleness. Interpenetrating polymer networks of cyanate ester resins and acrylate resins show considerably increased flexibility as well as resistance to moderately high temperature degradation. See, for example, U.S. Pat. No. 5,331,018. However, industrial applications at temperatures exceeding 275° C. are becoming more common, and the need exists for materials that are both flexible and durable at these temperatures.

Blends of cyanate ester resins and epoxy resins have been described. For example, U.S. Pat. Nos. 4,604,452, 4,785,075, 4,902,752, 4,983,683, 5,068,309, and 5,149,863 describe various blends of cyanate ester resins with glycidyl ethers of polyhydric phenols ('452 and '075) or with thermoplastic resins such as polysulfones, polyetherimides, polyarylethers, etc., terminated with epoxy groups ('752 and '683). Compositions of various morphologies and properties were obtained. Single polymer networks or polymer blends were obtained, but no interpenetrating polymer networks are disclosed.

U.S. Pat. No. 4,797,454 describes cyanate-functional oxazolinylpolysiloxanes useful for toughening resin systems such as epoxies and cyanates. Oligomeric epoxy-terminated siloxanes (e.g., glycidyl ethers) are reacted with dicyanates to give a resin additive, demonstrating that cross-reaction of glycidyl ethers with cyanates is faster than self-condensation of the epoxy compounds, so that no interpenetrating polymer network is formed.

U.S. Pat. No. 4,956,393 describes heat curable cyanate adhesive compositions comprising a cyanate ester resin, an epoxy resin, and a catalyst effective to promote the elevated temperature cure of the composition. Both polysiloxyl and cycloaliphatic epoxy resins are disclosed, while tin catalysts, e.g., tin octanoate, are said to be preferred for the polymerizations (col. 7, lines 8–9). In Example 9, a non-Bronsted acid initiator is used in an uncured composition comprising cycloaliphatic epoxy, cyanate ester, and polyimide.

U.S. Pat. No. 5,043,411 describes a thermosetting cyanate ester resin containing an epoxy resin pre-condensed with an aromatic amine or aromatic amide. As catalyst for the cyanate ester polymerization, only a coordination metal compound soluble in nonylphenol is described. Catalysts for the epoxy condensation reaction include amine salts, imidazoles, tertiary amines or hindered phenols. Interpenetrating polymer networks are not disclosed.

U.S. Pat. No. 5,330,684 describes Z-axis conductive adhesive compositions comprising cyanate ester resins, film-forming thermoplastic resins, epoxy resins including cycloaliphatic epoxies, an organometallic catalyst, and conductive particles. No Bronsted acids are disclosed as catalysts.

SUMMARY OF THE INVENTION

Briefly, the present invention provides a polymerizable composition of matter comprising a cycloaliphatic epoxy resin, a cyanate ester resin, optionally a polyol, a Bronsted acid as initiator, and optionally a stabilizer for the initiator.

In another aspect, the present invention provides an interpenetrating polymer network (IPN) prepared from the above-described polymerizable composition.

In a further aspect, there is provided a method of polymerizing monomers to provide an IPN comprising the step of polymerizing a miscible mixture of cycloaliphatic epoxy resin, a cyanate ester resin, optionally a polyol, and, as cationic initiator, a Bronsted acid, and optionally a stabilizer for the initiator, the energy for polymerization of the cycloaliphatic epoxy and cyanate ester resins being provided at temperatures differing by at least 20° C. so as to sequentially polymerize the resins and provide an IPN. The initial temperature of cure for the cycloaliphatic epoxy and the higher temperature of cure for the cyanate ester resin depend on the curable composition and the curatives employed.

It has been discovered that a mixed cycloaliphatic epoxy resin and cyanate ester resin composition comprising a Bronsted acid as initiator when subjected to two different temperatures (at least 20° C. apart) can be sequentially polymerized to provide an IPN which is stable at temperatures of at least about 300° C. for at least one hour. The IPNs are essentially free of epoxy-cyanate interreaction (cross-reaction) product. It has been found that the use of Bronsted acid as initiator provides an interpenetrating polymer network which is responsible for high temperature stability of the cured product.

The present invention provides the art with useful vibration damping, adhesive, abrasive, and coating compositions which are stable to temperatures of at least 300° C. for prolonged periods of time in the absence of oxygen. These materials exhibit stability over a broad range of temperatures. Surprisingly, brittleness typically associated with cyanate ester resins is not characteristic of the present invention IPNs. Rather, these IPNs are flexible and stable even at high temperatures (e.g., at least 300° C.).

In this application:

"Bronsted acid" means a compound capable of donating a proton, optionally with heating; the term includes compounds capable of generating a Bronsted acid;

"stabilizer" means an additive that controls the activity of a Bronsted acid initiator;

"sequentially polymerized" means polymerization of cycloaliphatic epoxy at a lower temperature followed by polymerization of cyanate ester at a higher temperature;

"interpenetrating polymer network" means a plurality of intermeshed polymers, each highly crosslinked, with essentially no cycloaliphatic epoxy-cyanate ester cross-reactions; and "B-stage" means at least partial cure of at least one component in a resin mixture, provided that all components are not fully cured; such a composition comprises monomeric and polymeric materials.

A desirable feature of the components of the present invention is that cycloaliphatic epoxies can be present as either a two-part liquid precursor or as a "B-staged" two-part composition. Another desirable feature of the components of the present invention is that they are essentially free of odor. Preferably, the starting materials exhibit low vapor pressure because of their relatively high molecular weights. Advantageously, the present invention compositions can be processed under the ambient environment, e.g., in the presence of oxygen. Additionally, the present invention IPNs can retain their flexibility at temperatures of at least 300° C. for at least one hour. Such materials make particularly useful vibration damping materials.

BRIEF DESCRIPTION OF THE DRAWING

FIG. 5 shows DMA scans I (non-annealed), J (intermediate annealed), and K (fully annealed) from <50° to >250° C. for sample III, a composition within the present invention.

FIG. 6 shows a DSC scan of the cure exotherm for a comparative composition.

FIG. 7 shows a DSC scan of cure exotherms for a composition of the present invention.

FIG. 8 shows a DSC scan of the cure exotherm of a comparative composition.

DETAILED DESCRIPTION OF PREFERRED EMBODIMENTS

Figure 1:
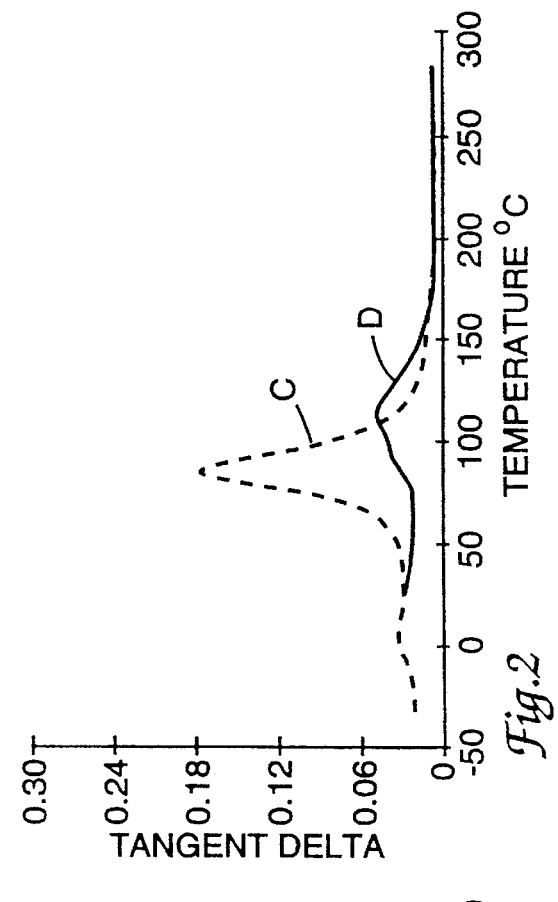
FIG. 1 shows DMA (dynamic mechanical analysis) scans from −70° to 280° C. for two compositions, A (comparative) and B (present invention).

Compositions of the present invention provide vibration-damping, adhesive, abrasive binder, and coating materials exhibiting remarkably high temperature stability and utility over a broad range of temperatures. For example, vibration damping materials comprising IPNs of the present invention are stable over a temperature range of about 0° to at least 300° C.

Compositions of the present invention comprise resins which are cured in sequential fashion using a single catalyst, a Bronsted acid, which activates the epoxy resin component at a temperature preferably at or near room temperature, then activates cyanate trimerization into poly(triazines) at temperatures at least 20° C. higher, preferably 50° C. higher, and more preferably 50° to 100° C. higher. It appears that Bronstead acids afford a much faster cycloaliphatic epoxy polymerization than cyanate ester polymerization at a specific temperature in the range of 0° to 150° C. The distinct separation in cure temperatures provides convenient processing and handling; the two-part system can be mixed and cured on site, or a "B-staged" film comprising at least partially cured cycloaliphatic epoxy resin and uncured cyanate ester can be prepared and easily transported to the work site where it can be cut or formed into a desired shape, applied between workpieces and thermally cured. The compositions of the invention are environmentally responsible, in that no solvents are used in any step of their formulation or use. Because the individual components are typically odorless, low vapor pressure liquids whose cures are unaffected by ambient oxygen, they can be handled and processed with only nominal precautions.

Cyanate ester resins comprise cyanate ester compounds (monomers and oligomers) each having one or preferably two or more —OCN functional groups, and typically having a cyanate equivalent weight of from about 50 to about 500, preferably from about 50 to about 250. Molecular weight of the monomers and oligomers are typically from about 150 to about 2000. If the molecular weight is too low, the cyanate ester may have a crystalline structure which is difficult to dissolve. If the molecular weight is too high, the compatibility of the cyanate ester with other resins may be poor.

Preferred compositions of the invention include one or more cyanate esters according to formulas I, II, III or IV. Formula I is represented by $$Q(OCN)_p \qquad \qquad I$$

where p is an integer from 1 to 7, preferably from 2 to 7, and wherein Q comprises a mono-, di-, tri-, or tetravalent aromatic hydrocarbon containing from 5 to 30 carbon atoms and zero to 5 aliphatic, cyclic aliphatic, or polycyclic aliphatic, mono- or divalent hydrocarbon linking groups containing 7 to 20 carbon atoms. Optionally, Q may comprise 1 to 10 heteroatoms selected from the group consisting of non-peroxidic oxygen, sulfur, non-phosphino phosphorus, non-amino nitrogen, halogen, and silicon.

Formula II is represented by

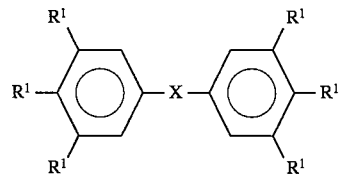

where X is a single bond, a lower alkylene group having from 1 to 4 carbons, —S—, or an $SO_2$ group; and where each $R^1$ is independently hydrogen, an alkyl group having from one to three carbon atoms, or a cyanate group (—OC≡N), with the proviso that at least one $R^1$ group is a cyanate group. In preferred compounds, each of the $R^1$ groups is either —H, methyl or a cyanate group, with at least two $R^1$ groups being cyanate groups.

Formula III is represented by

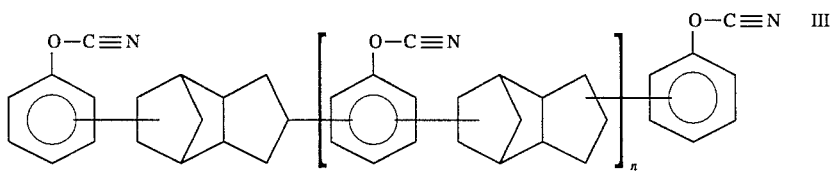

where n is a number from 0 to about 5.

Formula IV is represented by

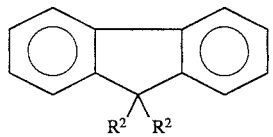

wherein each $R^2$ independently is

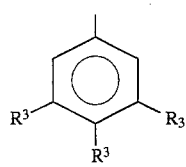

wherein each $R^3$ is independently —H, a lower alkyl group having from about 1 to about 5 carbon atoms, or a cyanate ester group, and preferably is a hydrogen, methyl or a cyanate ester group, with the proviso that the $R^3$s together comprise at least one cyanate ester group.

Useful cyanate ester compounds include, but are not limited to the following:
1,3- and 1,4-dicyanatobenzene;
2-tert-butyl-1,4-dicyanatobenzene;
2,4-dimethyl-1,3-dicyanatobenzene;
2,5-di-tert-butyl-1,4-dicyanatobenzene;
tetramethyl-1,4-dicyanatobenzene;
4-chloro-1,3-dicyanatobenzene;
1,3,5-tricyanatobenzene;
2,2'- and 4,4'-dicyanatobiphenyl;
3,3',5,5'-tetramethyl-4,4'-dicyanatobiphenyl;
1,3-, 1,4-, 1,5-, 1,6-, 1,8-, 2,6-, and 2,7-dicyanatonaphthalene;
1,3,6-tricyanatonaphthalene;
bis(4-cyanatophenyl)methane;
bis(3-chloro-4-cyanatophenyl)methane;
bis(3,5-dimethyl-4-cyanatophenyl)methane;
1,1-bis(4-cyanatophenyl)ethane;
2,2-bis(4-cyanatophenyl)propane;
2,2-bis(3,3-dibromo-4-cyanatophenyl)propane;
2,2-bis(4-cyanatophenyl)-1,1,1,3,3,3-hexafluoropropane;
bis(4-cyanatophenyl)ester;
bis(4-cyanatophenoxy)benzene;
bis(4-cyanatophenyl)ketone;
bis(4-cyanatophenyl)thioether;
bis(4-cyanatophenyl)sulfone;
tris(4-cyanatophenyl)phosphate, and
tris(4-cyanatophenyl)phosphate.

Also useful are cyanic acid esters derived from phenolic resins, e.g., as disclosed in U.S. Pat. No. 3,962,184, cyanated novolac resins derived from novolac, e.g., as disclosed in U.S. Pat. No. 4,022,755, cyanated bis-phenol-type polycarbonate oligomers derived from bisphenol-type polycarbonate oligomers, as disclosed in U.S. Pat. No. 4,026,913, cyano-terminated polyarylene ethers as disclosed in U.S. Pat. No. 3,595,900, and dicyanate esters free of ortho hydrogen atoms as disclosed in U.S. Pat. No. 4,740,584, mixtures of di- and tricyanates as disclosed in U.S. Pat. No. 4,709,008, polyaromatic cyanates containing polycyclic aliphatic groups as disclosed in U.S. Pat. No. 4,528,366, e.g., QUARTEX™7187, available from Dow Chemical, fluorocarbon cyanates as disclosed in U.S. Pat. No. 3,733,349, and cyanates disclosed in U.S. Pat. Nos. 4,195,132, and 4,116,946, all of the foregoing patents being incorporated herein by reference for teachings related to cyanates.

Polycyanate compounds obtained by reacting a phenol-formaldehyde precondensate with a halogenated cyanide are also useful.

Examples of preferred cyanate ester resin compositions include low molecular weight ($M_n$) oligomers, e.g., from about 250 to about 5000, e.g., bisphenol-A dicyanates such as AroCy™ "B-30 Cyanate Ester Semisolid Resin"; low molecular weight oligomers of tetra o-methyl bis-phenol F dicyanates, such as "AroCy™ M-30 Cyanate Ester Semisolid Resin"; low o molecular weight oligomers of thiodiphenol dicyanates, such as AroCy™ "T-30", all of which are commercially available from Ciba-Geigy Corp., Hawthorne, N.Y.

Cycloaliphatic epoxy resins useful in the invention preferably are selected from 3,4-epoxycyclohexylmethyl-3,4-epoxycyclohexane carboxylate (ERL-4221), 2-(3,4-epoxy-)cyclohexylmethyl-5,5'-spiro(3,4-epoxy)cyclohexane-m-dioxane (ERL-4234), and bis((4-methyl-7-oxabicyclo(4.1.0)hept-3-yl)methyl) adipate (ERL-4299), all of which are available from Union Carbide Corp., Tarrytown, N.Y.

Other commercially available cycloaliphatic epoxies that are useful in the present invention include vinyl cyclohexene monoxide (Union Carbide Corp.), cyclohexene oxide (Aldrich Chemical Co., Milwaukee, Wisc.), vinyl cyclohexene dioxide (ERL 4206™, Union Carbide Corp.), and limonene oxide, limonene dioxide, and α-pinene oxide (these three being available from Elf Atochem, Philadelphia, PA). Also useful are cycloaliphatic mono- and di-epoxy oligo-siloxanes, which include α, ω-di-(3,4-cyclohexene-2-ethyl) siloxanes, such as α, ω-di-(3,4-cyclohexene-2-ethyl)-tetramethyl disiloxane, α, ω-di(3,4-cyclohexene-2-ethyl)-hexamethyl trisiloxane, as well as α-3,4-cyclohexene-2-ethyl siloxanes, such as α-3,4-cyclohexene-2-ethyl pentamethyl disiloxane. These epoxies can be prepared according to the method of Crivello et al., J. Poly. Sci., A: Poly. Chem. 28, pp 479–503 (1990).

Optionally, compositions of the invention may include acyclic aliphatic, cycloaliphatic and oligomeric polyhydroxy compounds commonly known as polyols. Polyols are known in the art for their reaction with polyepoxy resins to form so-called "chain-extended" epoxies, wherein low- to medium-molecular weight copolymers are formed. These chain-extended epoxy resins can add flexibility and resilience to compositions of the invention without compromising their thermal stability. Amine chain-extenders are preferably avoided in the present invention because significant amounts of amines (i.e., 10% weight percent or greater of the total composition) interfere with the action of the initiator.

Polyols useful in the present invention preferably have two to five, more preferably two to four, hydroxyl groups. Examples of useful polyols include, but are not limited to, 1,2-ethanediol, 1,2-propanediol, 1,3-propanediol, 1,4-butanediol, 1,3-butanediol, 2-methyl-1,3-propanediol, 2,2-dimethyl-1,3-propanediol, and 2-ethyl- 1,6-hexanediol, 1,5-pentanediol, 1,6-hexanediol, 1,8-octanediol, neopentyl glycol, glycerol, trimethylolpropane, 1,2,6-hexanetriol, trimethylolethane, pentaerythritol, quinitol, mannitol, diethylene glycol, triethylene glycol, tetraethylene glycol, glycerine, 2-ethyl-2-(hydroxymethyl)-1,3-propanediol, 2-ethyl-2-methyl- 1,3-propanediol, pentaerythritol, 2-ethyl-1,3-pentanediol, and 2,2-oxydiethanol, sorbitol, 1,4-cyclohexane dimethanol, 1,4-benzene dimethanol, 2-butene-1,4-diol, and polyalkoxylated bis-phenol A derivatives. Other examples of useful polyols are disclosed in U.S. Pat. No. 4,503,211, which is incorporated herein by reference.

Useful higher molecular weight polyols include the polyethylene and polypropylene oxide polymers in the molecular weight range of 200 to 20,000 such as the Carbowax™ polyethyleneoxide materials supplied by Union Carbide, Tarrytown, N.Y., caprolactone polyols in the molecular weight range of 200 to 5,000, such as the Tone™ polyol materials supplied by Union Carbide, polytetramethylene ether glycol in the molecular weight range of 200 to 4,000, such as the Terathane™ materials supplied by Dupont (Wilmington, Del.), hydroxyl terminated polybutadiene resins such as the Poly bd™ supplied by Elf Atochem, Philadelphia, Pa., or equivalent materials supplied by other manufacturers. Polytetramethylene ether glycols, such as Poly THF 250™, Poly THF CD 1000™, and Poly THF CD 2000™, all available from BASF, Mount Olive, N.J., are particularly useful polyols. Polyether polyols and polyester polyols are particularly useful.

The alcohol functional component can be present as a mixture of materials and comprises poly-hydroxyl containing materials. When alcohol is present, the compositions preferably comprises an amount sufficient to provide an epoxy to hydroxy weight ratio in the composition between about 0.3:1 to 100:1, preferably between about 0.5:1 to 2:1. The ratio of (epoxy resin plus optional polyol) to cyanate ester resin in the composition of the invention is in the weight percent range (40 to 80) to (60 to 20), preferably (50 to 65) to (50 to 35).

Bronsted acid initiators useful in the present invention include any of the strong protic acids (i.e., proton donors) whose anions are sufficiently non-nucleophilic, nonbasic and nonreducing so as to prevent initiator deactivation and cationic chain termination. The conjugate base of such acids typically has a $pK_a$ of zero or less. Useful Bronsted acids of the invention include:

(1) fluoroalkanesulfonic acids or their salts of the general formula $(R_fSO_3)Y$ and bis(fluoroalkylsulfonyl) methanes of the general formula $(R_fSO_2)_2Q'$, as described, for example, in U.S. Pat. Nos. 3,907,706 and 4,049,861, each of which is incorporated herein by reference, wherein $R_f$ is a fluorinated, saturated, monovalent, non-aromatic, aliphatic radical that is straight-chain, branched-chain or cyclic and has a backbone preferably of carbon-to-carbon linkages. Preferably, $R_f$ is fully fluorinated, and contains less than 20 carbon atoms, preferably less than 8 carbon atoms, and, more preferably, contains from 1 to 3 carbon atoms;

Y is hydrogen or an ammonium cation having at least one hydrogen on the nitrogen atom;

Q' is a divalent radical of the general formula —NY— or —CR$^4$Y—, wherein R$^4$ is selected from the group consisting of H, Cl, Br, I, alkyl having from 1 to 19 carbon atoms, alkenyl having from 3 to 20 carbon atoms, aryl having up to 20 carbon atoms (preferably up to 10 carbon atoms), alkaryl having from 7 to 20 carbon atoms, or $R_fSO_2$; and Y is as defined above.

Preferred salts of fluoroalkanesulfonic acids are those wherein Y is as defined above; preferred bis(fluoroalkylsulfonyl) methanes are those wherein Q' is selected from the group consisting of —NH—, and —CH($R_fSO_2$)—;

(2) acid-generating esters, as described, for example, in U.S. Pat. No. 3,907,706, which is incorporated herein by reference. Preferably, acid-generating esters which decompose thermally are the esterification product of a tertiary alkyl alcohol and an acid that forms a chelation complex with a metal cation of a metal salt, and preferably comprise:

(a) any tertiary alcohols that form an ester reaction product with an appropriate acid may be used, including, but not limited to, t-butanol, 1,1-dimethylpropanol, 1-methyl-2-ethylpropanol, 1,1-dimethyl-n-butanol, 1,1-dimethyl-n-pentanol, 1,1-diphenylethanol, 1,1-dibenzylethanol, and the like, with (b) chelating acids preferably selected from the group consisting of oxalic, phosphoric, phosphorous, malonic, succinic, fumaric, glycolic, lactic, gamma-hydroxybutyric, oxalacetic, tartaric, pyruvic, acetoacetic, mercaptosuccinic, thiophosphoric, chromic, vanadic, and related acids.

Metal salts which can be useful with the above thermally-decomposable esters are those comprising essentially any metal; all metals inclusive of and to the left of aluminum, germanium, antimony and polonium on the periodic chart of the elements, and the rare earth metals can function in the invention. According to the Periodic Table in *Advanced Organic Chemistry*, Cotton and Wilkinson, 2d. Ed., Wiley Interscience Publishers, 1966, more preferred metals would be those of Groups IA, IIA, VIA, VIII, IB, IIB, IIIB, IVB and VB, VIB (CAS version of the Periodic Table) and lanthanum, titanium, zirconium, chromium, molybdenum, manganese, cesium and gadolinium. Counterions for the metal cations can be essentially any negatively-charged species commonly associated with a metal, and may include, but are not limited to, chloride, bromide, iodide, fluoride, fluoroalkylsulfonides and bis(fluoroalkylsulfonyl)methides generated from the above-noted fluoroalkylsulfonic acids and bis(fluoroalkylsulfonyl)methanes, those derived from mineral acids such as sulfonic, sulfuric, phosphonic, phosphoric, and the like;

(3) aromatic amine salts of antimony hexafluoride, as described, for example, in U.S. Pat. No. 3,542,828, which is incorporated herein by reference. Such salts preferably comprise compounds of the general formula $(R^5)_3NH^+SbF_6^-$, wherein each $R^5$ may be independently H or the same or different alkyl groups having from between 1 and 20 carbon atoms, and aryl, alkaryl, alkoxyaryl or haloaryl having up to 20 carbon atoms, provided that at least one $R^5$ is not hydrogen. Representative amines useful as hexafluoroantimonate salts include, but are not limited to, aniline, diphenylamine, triphenylamine, methylamine, dimethylamine, trimethylamine, ethylamine, diethylamine, triethylamine, hexylamine, nonylamine, (trichlorophenyl)amine, tritolylamine, and the like. Anilinium hexafluoroantimonate is a preferred example of this class of catalysts;

(4) hydroxylamine salts of antimony hexafluoride, as described, for example, in U.S. Pat. No. 3,879,312, incorporated herein by reference, which may be represented by the general formula $R^6R^7N(OH)H^+SbF_6^-$, wherein $R^6$ may be H, alkyl, aryl, aralkyl, alkaryl groups comprising up to 20 carbon atoms, preferably up to 10 carbon atoms, and $R^7$ may be alkyl, aryl, aralkyl, alkaryl groups comprising up to 20 carbon atoms, preferably up to 10 carbon atoms. Preferred groups include tolyl and benzyl, with benzyl being particularly preferred. Examples of these catalysts include hexafluoroantimonates of mono- and diphenylhydroxylammonium, mono- and dibenzylhydroxylammonium, mono- and bis(m-chlorophenyl)hydroxylammonium, and mono- and bis-(p-tolyl)hydroxylammonium. Dibenzylhydroxylammonium hexafluoroantimonate is a most preferred example of this class of catalysts;

(5) salts of the general formula $MF_m OR^{8-} H^+$, which are formed by the general reaction of an alcohol $R^8 OH$ with a functionally complementary compound comprising a perfluoro group $MF_m$, wherein $OR^8$ is the residue of an aliphatic or aromatic alcohol preferably having a molecular weight ($M_n$) of 32 to at least about 100,000, and a primary or secondary hydroxyl functionality of at least 1, preferably at least 2; M is an atom selected from the group consisting of boron, antimony, arsenic, phosphorous, and the like; and m is the valence of the atom M. Representative examples of such perfluorometal compounds are $BF_3$, $PF_5$, $AsF_5$, $SbF_5$, and related compounds, and the like. A example of this class of compounds is the complex formed by the reaction of $BF_3$ with methanol;

(6) liquid salts of substituted pentafluoroantimonic acids and aromatic amines (as stabilizers), as described, for example, in U.S. Pat. No. 4,503,211, incorporated herein by reference, wherein the aromatic amines preferably are selected from the group consisting of aniline and hindered amines, wherein the hindered amines are of the general formula

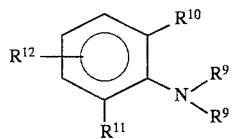

wherein each $R^9$ is independently hydrogen, primary or secondary alkyl group having from 1 to about 10 carbon atoms, or benzyl;

$R^{10}$, $R^{11}$, $R^{12}$ are independently hydrogen, an alkyl group having 1 to 10 carbon atoms, benzyl, or an electron donating group, or at least one of $R^{10}$ and $R^{11}$ is joined together with $R^{12}$ to form a benzo group; provided that, if no benzo group is present in the hindered amine, at least one of $R^9$, $R^{10}$, and $R^{11}$ is an alkyl group or an electron donating group; and if $R^{10}$, $R^{11}$ and one $R^9$ is hydrogen, the other $R^9$ is an alkyl group having at least two carbon atoms.

Suitable electron donating groups include hydroxyl group, branched straight chain or cyclic alkyl or alkoxy groups having up to 18 carbon atoms and amine groups.

The substituted pentafluoroantimonic acid can have the formula $HSbF_5X$, wherein X is halogen, hydroxy, or —$OR^{13}$, wherein $OR^{13}$ is the residue of an aliphatic or aromatic alcohol preferably having a molecular weight (Mn) of 32 to at least about 100,000, and a primary or secondary hydroxyl functionality of at least 1, preferably at least 2. The most preferred s alcohol is diethylene glycol, i.e., the most preferred —$OR^{13}$ group is 2-(2-hydroxyethoxy)ethoxy, and the most preferred example of this class of catalysts is the equimolar reaction product of antimony pentafluoride, diethylene glycol (DEG) and 2,6-diethylaniline (DEA).

The initiator can be present in the range of 0.1 to 10 percent by weight of the polymerizable composition, preferably 0.5 to 5 percent. Optionally, an effective amount of an aromatic amine as stabilizer (less than 10 weight percent, preferably 0.1 to 8 weight percent based on the total composition) can be used with the catalyst to inhibit premature curing.

High temperature stable resins of the invention are prepared generally by admixture of a cyanate ester resin, cycloaliphatic epoxy resin, preferably a polyether polyol, and a suitable Bronsted acid. In one embodiment, the mixture can be spread on a suitable heat-resistant release liner, then cured at 90°–150° C., preferably 100°–125° C., for 1–15 minutes, preferably 5–8 minutes. The resultant film is a flexible, tough sheet that can be cut or shaped, then applied between workpieces that are to be bonded together. Subsequent heating, preferably at temperatures above 200° C., cures the cyanate ester component and produces, in this embodiment, a temperature-resistant vibration-damping bond. It is within the scope of the invention that a curable mixture may be cast into a preferred shape or into a cavity, then heated to cure the composition in place. Heating can be carried out in a single continuous operation or in two distinct steps, separated in time. The initiator provides for independent polymerization of the cycloaliphatic epoxy resin and the cyanate ester resin. Finally, a tough, high-temperature protective coating may be prepared by heating a composition of the invention that has been applied directly on a substrate.

The present invention IPNs provide ultra high temperature damping materials, high temperature adhesives, binders for use in high temperature s abrasives, and high temperature protective coatings. In the IPN there are two intermeshed components, each highly crosslinked, and not swellable by solvents.

The polymerizable composition of the present invention can be provided as a kit comprising a two-part composition, a first part comprising a cycloaliphatic epoxy resin and a cyanate ester resin, and a second part comprising a Bronsted acid initiator and optionally a polyol.

Objects and advantages of this invention are further illustrated by the following examples, but the particular materials and amounts thereof recited in these examples, as well as other conditions and details, should not be construed to unduly limit this invention. In the Examples below, LAC means a mixture comprising a 1:1:2.93 weight-to-weight ratio of $SbF_5$:diethylene glycol (DEC) and 2,6-diethylaniline (DEA), as stabilizer, the preparation of which is described in U.S. Pat. No. 4,503,211, example 1, which is incorporated herein by reference.

EXAMPLES

Example 1

Comparison of Cure via Bronsted and Lewis Acid Catalysts

A solution of 1 part α, ω-di-(3,4-epoxycyclohexane-2-ethyl)tetramethyl disiloxane, 8 parts α-3,4-epoxycyclohexane-2-ethyl pentamethyl disiloxane, both of which were prepared according to the method described by Crivello et al., *J. Poly. Sci.: A: Poly. Chem* Vol. 28, p. 479–503 (1990), 8 parts vinylcyclohexene oxide (available from Union Carbide Corp., Tarrytown, N.Y.) and 4 parts cyclohexene oxide (available from Aldrich Chemicals, Milwaukee, Wisc.) was stirred and thoroughly mixed at room temperature, then mixed with 21 parts B-30 cyanate ester oligomer (available from Ciba-Geigy, Ardsley, N.Y.) which had previously been heated to 100° C. The mixture was stirred and allowed to cool to room temperature, whereupon an aliquot (sample B)

of the mixture was taken and mixed with one part (relative to the aliquot weight) of LAC. A second aliquot (sample A) was taken and mixed with one part (relative to the weight of the aliquot) of dicyclopentadienyl iron antimony hexafluoride ($Cp_2FeSbF_6$, a Lewis acid initiator), 40% by weight in 3-methyltetrahydrothiophene-1,1-dioxide (3-methyl sulfolane, available from Aldrich). Samples A and B were knife-coated between 0.050 mm silicone-release-coated polyethylene terephthalate sheets and the sandwich construction was heated in a convection oven at 125° C. for 7 minutes such that the resin mixture formed a flexible free-standing film. The release liners were removed and a sample of the resin film was cut into a 51×12.5 mm coupon which was sandwiched between two 0.25 mm thick steel coupons of the same size as the resin film coupon and analyzed by dynamic mechanical analysis (DMA) in a constrained layer geometry using a Seiko Instruments DMS 110 Rheometer using a 20 mm flexure fixture. Samples A and B were annealed for two hours at 260° C. DMA tracings of tan delta values of the two samples are shown in FIG. 1. This trial shows that Lewis acid catalysis afforded a single-phase morphology exhibiting a narrow temperature range where tan delta $\geq 0.06$, thus limiting its utility as a vibration damping material. Conversely, the resin mixture cured by Bronsted acid catalysis, per the present invention, exhibited a tan delta $\geq 0.06$ over a temperature range of greater than 100° C. These trials also show the excellent thermal stability of compositions of the invention; even after annealing for two hours at 260° C.;, the mixture cured by Bronsted acid catalysis showed excellent damping.

Further, the scans of FIG. 1 show that sample B had desirable damping properties over a wider range than sample A, the comparative sample. Tan delta indicates the vibration damping efficiency of a material. Tan delta values of 0.06 are accepted in the art as a minimum for adequate damping for such a metal-polymer-metal composite. The LAC initiator can be replaced by an equivalent number of moles of $HC(SO_2CF_3)_3$ or $HN(SO_2CF_3)_2$ to provide compositions having desirable properties within the present invention.

Cyanate ester resin QUARTEX 7187 can be used instead of B-30 to provide a composition having desirable properties within the present invention.

Example 2

Thermal Stability of Glycidyl Ether Epoxy Resins (Comparative)

Figure 2:
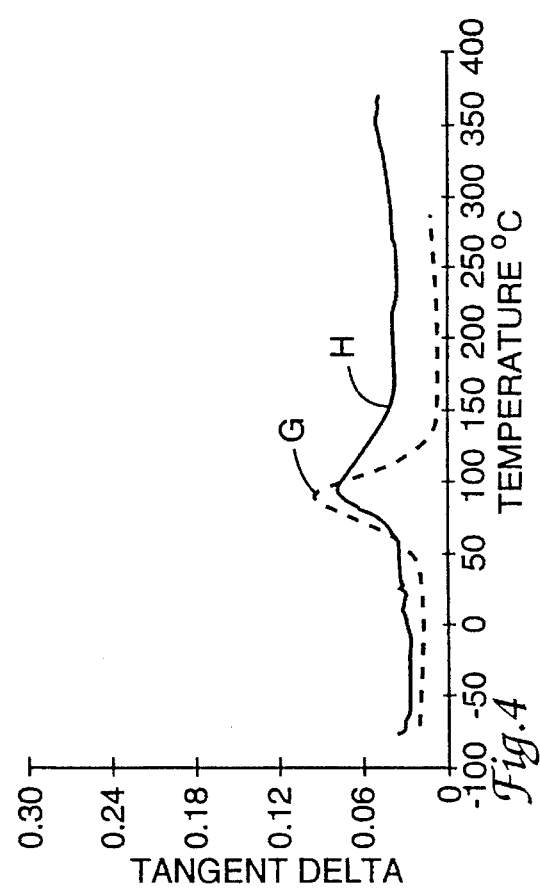
FIG. 2 shows DMA scans of a comparative composition comprising glycidyl epoxy resin C. (non-annealed) and D (annealed).

A 1:1 mixture of neopentyl glycol diglycidyl ether (Heloxy 68, available from Shell Chemicals Co., Houston, Tex.) and B-30 cyanate ester resin (available from Ciba-Geigy, Ardsley, N.Y.) was stirred and mixed with 5% by weight of LAC. The mixture was coated via a Meyer bar apparatus (#28) onto a 0.20 mm (8 mil) thick steel sheet and immediately covered with a second steel sheet to form a sandwich. The sandwich construction was heated at 150° C. in a convection oven for 10 minutes, and then a coupon of 51×12 mm was cut from the sandwich, then annealed in a convection oven at 260° C. for two hours and cooled. The sample was processed in a DMA rheometer (as in Example 1) four times by ramping from ambient temperature to 250° C. at 5° C. per minute, cooling rapidly with liquid nitrogen, then cycling twice from −40° C. to 250° C. at the same heating rate and holding at that temperature for 20 minutes, then cycling over the same range and holding for 50 minutes, then recording the tan delta from ambient at 275° C. The results are shown in FIG. 2. It is clear that the resin had lost essentially all of its vibration damping ability by the time the fourth scan is taken. In sum, scan C of FIG. 2 represents data before annealing and scan D data was after annealing at 250° C. for the combined total of 90 minutes. The data show poor thermal stability as indicated by scan D. In scan D there were no thermal ranges having tan delta values of 0.06 or above.

Example 3

Effect of Catalyst on Thermal Stability

In order to compare the vibration-damping and thermal stability characteristics of cycloaliphatic epoxy resin, cyanate ester resin, and polyol polymer networks prepared using Bronsted acid catalysts of the present invention and art-known cationic catalysts, the following comparative tests were performed:

A stock solution of two parts B-30 cyanate ester resin (available from Ciba-Geigy, Ardsley, N.Y.), one part bis((4-methyl-7-oxabicyclo[4.1.0]hept-3-yl)methyl) adipate (available as ERL-4299 from Union Carbide Corp., Tarrytown, N.Y.) and one part polytetrahydrofuran polyol (PolyTHF CD 1000™ polyol chain extender, BASF, Mount Olive, N.Y.) was prepared. 100 parts of the stock solution were mixed with a portion of each catalyst, as shown in Table 1, and the mixture was knife-coated at a thickness of 0.1 mm between two 0.05 mm-thick release-coated poly(ethyleneterephthalate) films (Toyo Metallizing Co., Tokyo, Japan), and the mixture was cured to a "B-stage" free-standing film by heating at the temperatures and times shown in Table 1, below.

TABLE 1

| Sample | Catalyst | Catalyst Amount, parts | Temp, °C. | "B-stage" cure time, min. |
|---|---|---|---|---|
| I | $[C_5H_5Fe(CO)_2]_2$[b] (comparative) | 1 | 135 | 4 |
| II | Zinc naphthenate sulfanilamide[c] (comparative) | 1.3[d] 2.2[e] | 135 | 60 |
| III | LAC[a][f] | 5 | 125 | 7 |

[a]Bronsted acid catalyst system defined above
[b]As described in U.S. Pat. No. 5,330,684
[c]As described in U.S. Pat. No. 5,043,411
[d]67% solution in mineral oil; available from Strem Chemicals Inc., Newport, MA
[e]dissolved in minimal amount of 3-methylsulfolane
[f]Instead of LAC, the same number of moles of the reaction product of $SbF_5$ and diethylene glycol or anilinium hexafluoroantimonate can be used to provide a composition having desirable properties within the present invention.

Cure times and temperatures were varied according to the relative effectiveness of the catalyst in order to obtain approximately the same degree of cure for each sample.

Figure 3:
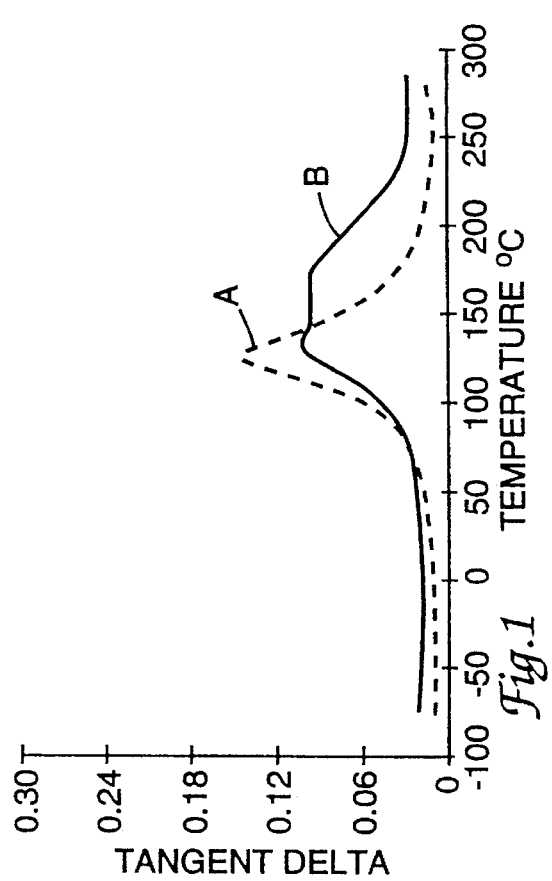
FIG. 3 shows DMA scans E and F from −70° to >250° C. of comparative sample I.
Figure 4:
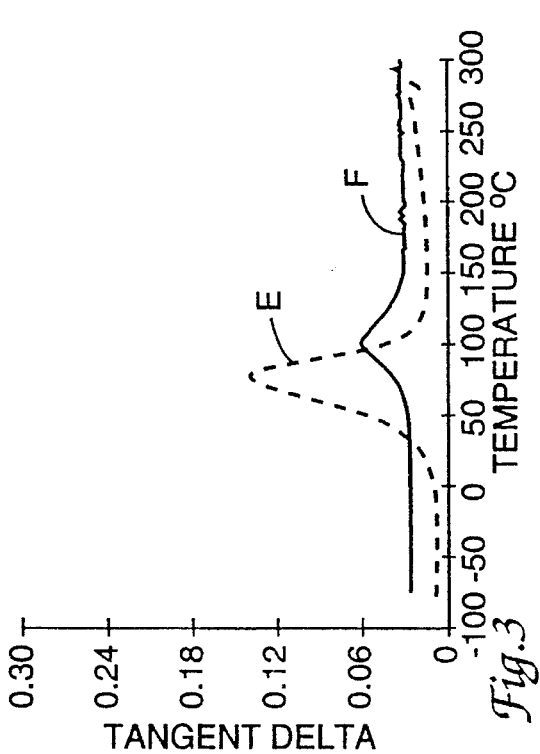
FIG. 4 shows DMA scans G (non-annealed) and H (annealed) from −70° to >250° C. of comparative sample II.

The "B-staged" films were removed from the liners and a piece approximately 5 cm×1.3 cm was cut from each and laminated by hand between two 0.20 mm thick steel shims of similar dimensions. Each of the sandwich constructions was subjected to dynamic mechanical analysis (DMA) using a Seiko DMS-100 instrument equipped with a 20 mm flexure fixture, using the temperature cycling regimen shown in Table 2. During scan 2, the "B-staged" samples continued to cure and were deemed to be largely cured by the end of the 30-minute (scan 2) hold at 260° C. Tangent delta vs. temperature data are shown in FIGS. 3, 4, and 5 for the $[C_5H_5Fe(CO)_2]_2$, zinc naphthenate-sulfanilamide catalyst systems, and the Bronsted acid, respectively, taken for scans 4 and 8, in order to compare high-temperature damping and high-temperature stability characteristics of the resulting cured polymer systems.

TABLE 2

| Scan | From [°C.] | To [°C.] | Rate [°C./min] | Hold [min] |
| --- | --- | --- | --- | --- |
| 1 | 20 | −80 | 50 | 15 |
| 2 | −80 | 260 | 5 | 30 |
| 3 | 260 | −80 | 50 | 15 |
| 4 | −80 | 300 | 5 | 30 |
| 5 | 300 | −80 | 50 | 15 |
| 6 | −80 | 330 | 5 | 60 |
| 7 | 330 | −80 | 50 | 15 |
| 8 | −80 | 350 | 5 | 5 |
| 9 | 350 | 0 | 50 | 0 |

Scan E (sample I from TABLE 1, scan procedure 4) represents non-annealed material and scan F (sample I from TABLE 1, scan procedure 8) represents the same sample which was annealed through eight scan cycles as shown in Table 2. The data show that comparative annealed sample 1 exhibited poor thermal stability.

Scan G (sample II, from Table 1, scan procedure 4) represents non-annealed material and scan H (sample II, from Table 1, scan procedure 8) represents the same sample which was annealed through eight scan cycles as shown in Table 2. Both scans of sample II show narrow ranges for damping utility.

Scans J (sample III, from Table 1, scan procedure 6) and K (sample III, from Table 1, scan procedure 8) show excellent thermal stability. Both scans show broadened damping utility of sample III. Scan I (sample III, from Table 1, scan procedure 4) represents a non-annealed sample. Scans I, J, and K relate to the same sample (III).

Results presented in FIGS. 3, 4, and 5 clearly show the superior high temperature damping characteristics of the IPN system obtained when a Bronsted acid catalyst system, LAC, was used (FIG. 5). In order to be considered a good damping material, the tan δ should be above 0.06 over an extended temperature range. Only the IPN prepared according to the present invention exhibited the desired damping characteristics.

The Figures also show superior high-temperature stability of the IPN system of the present invention, since damping ability was retained after repeated exposure to temperatures in excess of 300° C. Thus, the area under the curve having tan δ values equal to or greater than 0.06 remained essentially constant in FIG. 5 but decreased significantly for FIGS. 3 and 4.

Example 4

Preparation of Adhesives from IPNs of the Invention

A stock solution containing 30 g of 2 parts of bisphenol-A dicyanate (B-30 cyanate ester resin), 2 parts bis((4-methyl-7-oxabicyclo[4.1.0]hept-3-yl)methyl) adipate (ERL-4299), polytetramethylene ether glycol (PolyTHF CD 1000) polyol chain extender was prepared and stirred with 1.5 g LAC catalyst system until a uniform color was attained. The mixture was divided, with one portion coated onto steel stock (see below) and one portion coated between two Kapton™ polyimide films (see below).

Instead of LAC, the same number of moles of any of anilinium $C(SO_2CF_3)_3$, lithium tris(trifluoromethylsulfonyl) methide and di(tert-butyl)oxalate, or dibenzylhydroxylammonium hexafluoroantimonate can be used as initiator to provide compositions having desirable properties within the present invention.

T-Peel Adhesion to Steel

A portion of the mixture above was coated onto a 15×30 cm coupon of 0.02 cm thick steel shim stock that had been previously cleaned with isopropyl alcohol, using an RDS 50 Meyer Rod coater. A second piece of previously-washed steel, of identical dimensions, was placed over the coated sheet, and the sandwich assembly was heated in an oven at 125° C. for 30 minutes. After cooling to room temperature, a 2.54 cm wide strip was cut from the laminated construction. The strip was placed in the jaws of an Instron tensile testing apparatus (Model No. 1122) to determine its peel strength. The cross-head speed was 25.4 cm/minute. T-peel adhesive strength was 112 N/dm (2800 g/cm).

T-Peel Adhesion to Kapton™ (Polyimide)

A portion of the above mixture was knife coated (net thickness of 0.02 mm) between two pieces of 0.005 cm Kapton™ film measuring 10 cm×60 cm. The laminate was heated in an oven at 125° C. for 30 minutes. After cooling to room temperature, a 1.27 cm strip was cut from the laminated construction. T-peel adhesion, tested as above, was 44 N/dm (1100 g/cm).

The data of this example show that the mixed epoxy resin-cyanate ester IPN of the invention provided a good adhesive formulation.

Example 5

Comparison of Cure Profiles of glycidyl epoxy/cyanate ester (comparative) and cycloaliphatic epoxy/cyanate ester compositions.

An aliquot of the mixture of Example 2 (comparative) was separated (prior to coating) for DSC (differential scanning calorimetry) analysis, shown in FIG. 6 (comparative). The instrument used was a Seiko DSC Analyzer, Model. No. DSC220C. The sample was heated at 10° C. per minute. The scan of FIG. 6 shows that the cure exotherms of the glycidyl epoxy resin and cyanate ester resin almost completely coincide. The scan indicates that a substantial amount of the product is a copolymer of cyanate ester and glycidyl epoxy.

A 1:1 mixture of cycloaliphatic epoxy resin, ERL 4299 and cyanate ester resin B-30, were stirred and mixed with 5% by weight of LAC. The mixture was subjected to DSC analysis using the instrument and conditions described above for DSC analysis. The scan is shown in FIG. 7 and the two distinct peaks are designated L and M. Lower temperature peak L is associated with cycloaliphatic epoxy polymerization, and higher temperature peak M represents the exotherm of the cyanate ester polymerization.

Example 6

Aliquots of samples A and B prepared as in Example 1 were analyzed in a Seiko DSC220C. Differential Scanning Caloimeter. The heating rate was 10° C. per minute. These scans are shown in FIGS. 8 and 9, respectively.

Scan of FIG. 8 (comparative) shows that when a Lewis acid was present as an initiator, the cure exotherm of cyclo aliphatic epoxy resin was not distinct from that of the cyanate ester resin. The scan indicates that a substantial amount of product was a copolymer of cyanate ester and epoxy. The scan of FIG. 9 shows two distinct peaks, designated N and O. Lower temperature peak N is associated with cycloaliphatic epoxy polymerization, and higher temperature peak O represents the exotherm of the cyanate ester polymerization.

Figure 9:
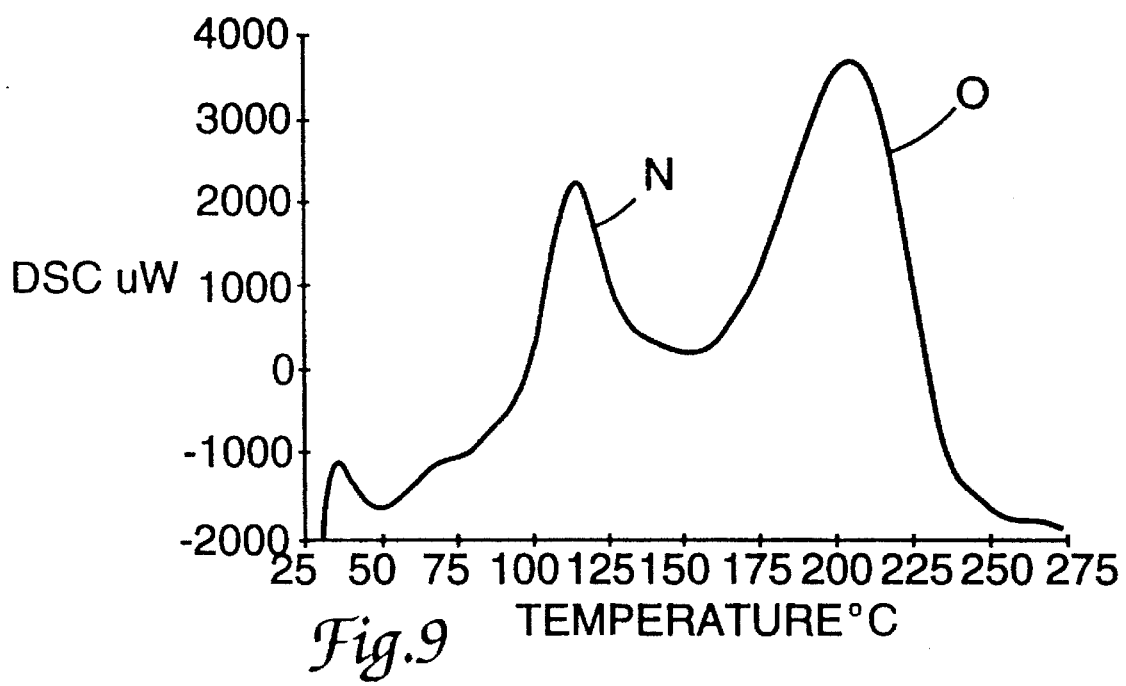
FIG. 9 shows a DSC scan of cure exotherms for a composition of the present invention.

DSC scans of LAC-initiated epoxy resin cure and of LAC-initiated cyanate ester resin cure confirmed the assignment of peaks in FIGS. 7 and 9.

Various modifications and alterations of this invention will become apparent to those skilled in the art without departing from the scope and spirit of this invention, and it should be understood that this invention is not to be unduly limited to the illustrative embodiments set forth herein.

We claim:

1. A polymerizable composition of matter comprising a cycloaliphatic epoxy resin, a cyanate ester resin, and as single initiator, a Bronsted acid.

2. The composition according to claim 1 further comprising a polyol.

3. The composition according to claim 1 further comprising a stabilizer for said initiator.

4. The composition according to claim 1 which has been partially cured to a B-stage.

5. The composition according to claim 1 wherein said epoxy resin is a mono- or di-epoxy oligo-siloxane.

6. The composition according to claim 1 wherein said cyanate ester resin has any of formulas I, II, III, or IV, wherein $$Q(OCN)_p \qquad \text{I}$$

wherein p can be an integer from 1 to 7, and wherein Q comprises at least one of the following categories: (1) a mono-, di-, tri-, or tetra-substituted aromatic organic group comprising from about 5 to about 30 carbon atoms, (2) a 1 to 5 aliphatic or polycyclic aliphatic mono-, di-, tri- or tetra-substituted organic group comprising from about 7 to about 20 carbon atoms;

Formula II is represented by

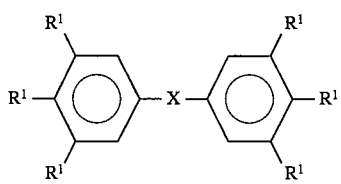

where X is a single bond, a lower alkylene group having from 1 to 4 carbon atoms, —S—, or an $SO_2$ group; and wherein each $R^1$ is independently hydrogen, an alkyl group having from one to three carbon atoms, or a cyanate ester group (—OC≡N), with the proviso that at least one $R^1$ group is a cyanate ester group;

Formula III is represented by

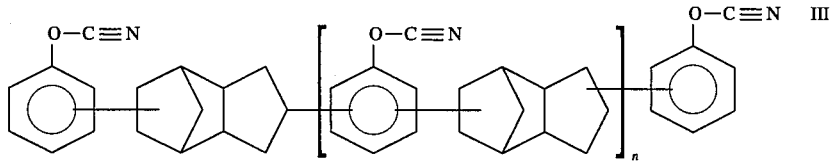

where n is a number from 0 to about 5;

Formula IV is represented by

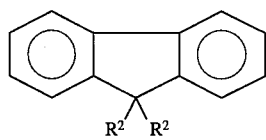

wherein each $R^2$ independently is

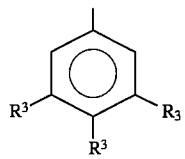

wherein each $R^3$ is independently —H, a lower alkyl group having from about 1 to about 5 carbon atoms, or the cyanate ester group, with the proviso that the $R^3$ s together comprise at least one cyanate ester group.

7. The composition according to claim 1 wherein said cyanate ester resin has an equivalent weight in the range of 50 to 500.

8. The composition according to claim 1 wherein said polyol is selected from the group consisting of cycloaliphatic, acyclic aliphatic, and oligomeric polyhydroxy compounds, polyether polyols, and polyester polyols.

9. The composition according to claim 2 wherein the range in weight percent of (epoxy resin plus polyol) to cyanate ester resin is (40 to 80) to (60 to 20).

10. The polymerizable composition according to claim 1 wherein said Bronsted acid initiator has a formula selected from $(R_fSO_3)Y$ and $(R_fSO_2)_2Q'$ wherein $R_f$ is a fluorinated, saturated, monovalent, non-aromatic, aliphatic radical that is straight-chain, branched-chain or cyclic;

Y is hydrogen or an ammonium cation having at least one hydrogen on the nitrogen atom;

Q' is a divalent radical of the general formula —NY— or —$CR^4Y$—, wherein $R^4$ is selected from the group consisting of H, Cl, Br, I, alkyl having from 1 to 19 carbon atoms, alkenyl having from 3 to 4 carbon atoms, aryl having up to 20 carbon atoms, alkaryl having from 7 to 20 carbon atoms, or $R_fSO_2$; and Y is as defined above.

11. The polymerizable composition according to claim 1 wherein said Bronsted acid is an acid-generating ester.

12. The polymerizable composition according to claim 1 wherein said Bronsted acid is an aromatic amine salt of antimony hexafluoride.

13. The polymerizable composition according to claim 1 wherein said Bronsted acid is a hydroxylamine salt of antimony hexafluoride.

14. The polymerizable composition according to claim 1 wherein said Bronsted acid is a salt having the formula $MF_mOR^{8-}H^+$, which is formed by the reaction of an alcohol $R^8OH$ with a functionally complementary compound comprising a perfluoro group $MF_m$, wherein $OR^8$ is the residue of an aliphatic or aromatic alcohol having primary or secondary hydroxyl functionality of at least 1; M is an atom selected from the group consisting of boron, antimony, arsenic, and phosphorous; and m is the valence of the atom M.

15. The polymerizable composition according to claim 1 wherein said Bronsted acid is a liquid salt of a substituted pentafluoroantimonic acid which is used in combination with an aromatic amine as stabilizer for said initiator.

16. The composition according to claim 1 wherein said initiator is present in the range of 0.1 to 10 percent by weight of the polymerizable composition.

17. The polymerized composition according to claim 1 which provides an interpenetrating polymer network.

18. The composition according to claim 17 which provides a vibration damping composition.

19. The composition according to claim 17 which provides an adhesive composition.

20. The composition according to claim 17 which provides a binder for abrasives.

21. The composition according to claim 17 which provides a protective coating.

22. The polymerized composition according to claim 1.

23. A method of polymerizing monomers to provide an interpenetrating polymer network comprising the steps of:
    preparing a miscible mixture of cycloaliphatic epoxy resin, a cyanate ester resin, and as initiator a Bronsted acid, and
    polymerizing said monomers sequentially at temperatures differing by at least 20° C., so as to provide said IPN.

24. The method according to claim 23 wherein said miscible mixture further comprises a polyol.

25. The method according to claim 23 wherein said miscible mixture further comprises a stabilizer for said Bronsted acid.

26. The method according to claim 23 wherein said difference in temperatures is at least 50° C.

27. The method according to claim 23 wherein said difference in temperatures is in the range of 50°–100° C.

28. The method according to claim 23 wherein polymerization of said epoxy resin is initiated first.

29. The polymerized composition prepared according to the method of claim 23.

30. A kit comprising a two-part composition, a first part comprising a cycloaliphatic epoxy resin and a cyanate ester resin, and a second part comprising as initiator a single Bronsted acid and optionally at least one of a polyol and a stabilizer.

31. The kit according to claim 30 wherein said first part further comprises a polyol.

32. A polymerizable composition of matter comprising
    a cycloaliphatic epoxy resin,
    a cyanate ester resin, and
    as a single initiator, a Bronsted acid, said composition being capable of producing a plurality of intermeshed polymers, each highly crosslinked, with essentially no cycloaliphatic epoxy-cyanate ester cross-reactions.

* * * * *

UNITED STATES PATENT AND TRADEMARK OFFICE
CERTIFICATE OF CORRECTION

PATENT NO.  : 5,494,981
DATED       : February 27, 1996
INVENTOR(S) : Ilya Gorodisher et al.

It is certified that error appears in the above-indentified patent and that said Letters Patent is hereby corrected as shown below:

Col. 6, line 26, "low o molecular" should read -- low molecular --.

Col. 13, line 60, "dicyanatc" should read -- dicyanate --.

Signed and Sealed this

Third Day of September, 1996

Attest:

BRUCE LEHMAN

*Attesting Officer*    *Commissioner of Patents and Trademarks*